US012512604B2

(12) United States Patent
Trumbull et al.

(10) Patent No.: US 12,512,604 B2
(45) Date of Patent: Dec. 30, 2025

(54) 2D PHASED ARRAY ANTENNA PANEL WITH CONTOURED EDGES

(71) Applicant: LeoLabs, Inc., Menlo Park, CA (US)

(72) Inventors: Craig Robert Trumbull, San Francisco, CA (US); John J. Buonocore, Redwood City, CA (US); Aaron Carroll, Sunnyvale, CA (US); Matthew Alan Stevenson, San Jose, CA (US)

(73) Assignee: LeoLabs, Inc., Menlo Park, CA (US)

( * ) Notice: Subject to any disclaimer, the term of this patent is extended or adjusted under 35 U.S.C. 154(b) by 77 days.

(21) Appl. No.: 18/658,750

(22) Filed: May 8, 2024

(65) Prior Publication Data

US 2024/0396228 A1 Nov. 28, 2024

Related U.S. Application Data

(60) Provisional application No. 63/464,739, filed on May 8, 2023.

(51) Int. Cl.
*H01Q 21/06* (2006.01)
*H01Q 1/42* (2006.01)
*H01Q 9/04* (2006.01)

(52) U.S. Cl.
CPC ........... *H01Q 21/065* (2013.01); *H01Q 1/422* (2013.01); *H01Q 9/0435* (2013.01)

(58) Field of Classification Search
None
See application file for complete search history.

(56) References Cited

U.S. PATENT DOCUMENTS

| | | | | |
|---|---|---|---|---|
| 6,184,832 | B1 | 2/2001 | Geyh et al. | |
| 11,316,280 | B2 * | 4/2022 | West | H01Q 3/46 |
| 11,527,833 | B1 * | 12/2022 | Yousefi | H01Q 3/30 |
| 2022/0416422 | A1 * | 12/2022 | Shahvirdi Dizaj Yekan | H01Q 1/3233 |
| 2022/0416436 | A1 * | 12/2022 | Zólomy | H01Q 21/065 |
| 2023/0038429 | A1 * | 2/2023 | Huang | H01Q 1/2283 |
| 2023/0092709 | A1 * | 3/2023 | Swernofsky | H01Q 21/065 343/848 |

OTHER PUBLICATIONS

Raytheon wins $651 million SPY-6 radar contract, Collins Aerospace, RTX 90.45, Raytheon An RTX Business, Mar. 31, 2022, 6 pages.

* cited by examiner

*Primary Examiner* — Wilson Lee
(74) *Attorney, Agent, or Firm* — Dentons US LLP

(57) ABSTRACT

Two-dimensional (2D) phased-array antenna panels having contoured edges. When combined with like 2D phased-array antenna panels to form a 2D phased-array antenna module, antenna elements located along each contoured edge of a given 2D antenna panel are separated by a first distance from a corresponding antenna element located along a contoured edge of an adjacent 2D antenna panel. The first distance being equal to the distance between adjacent antenna elements on the same 2D antenna panel.

22 Claims, 8 Drawing Sheets

FIG. 3(a)
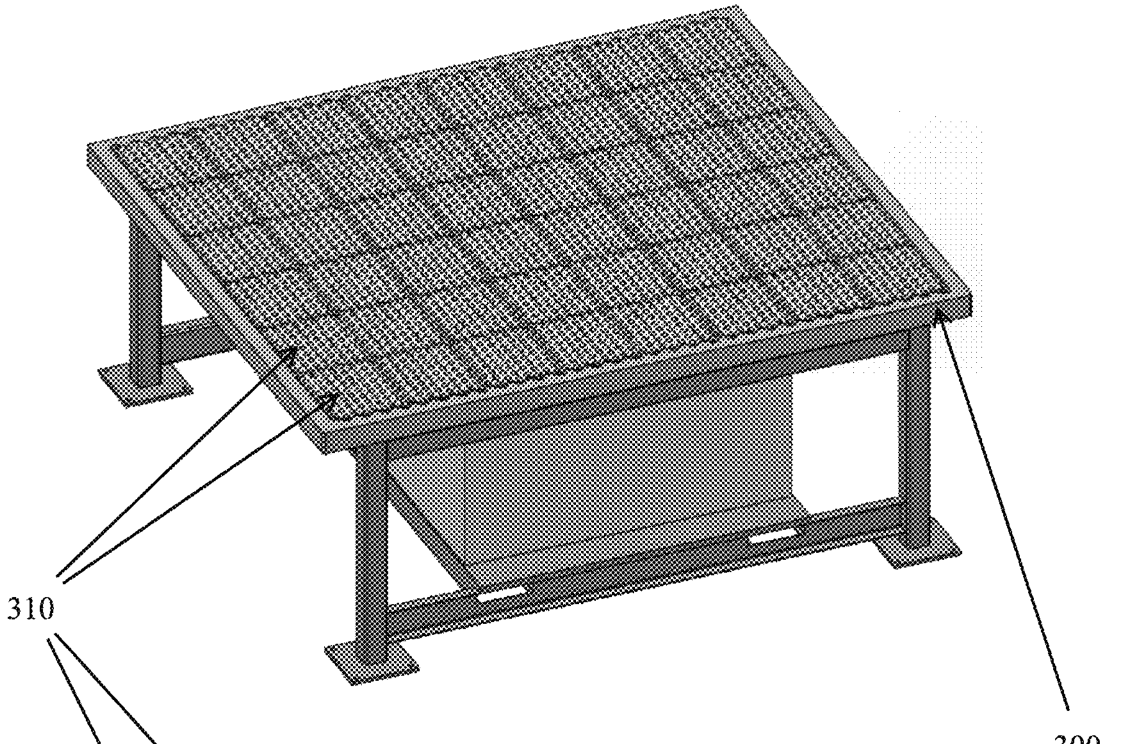
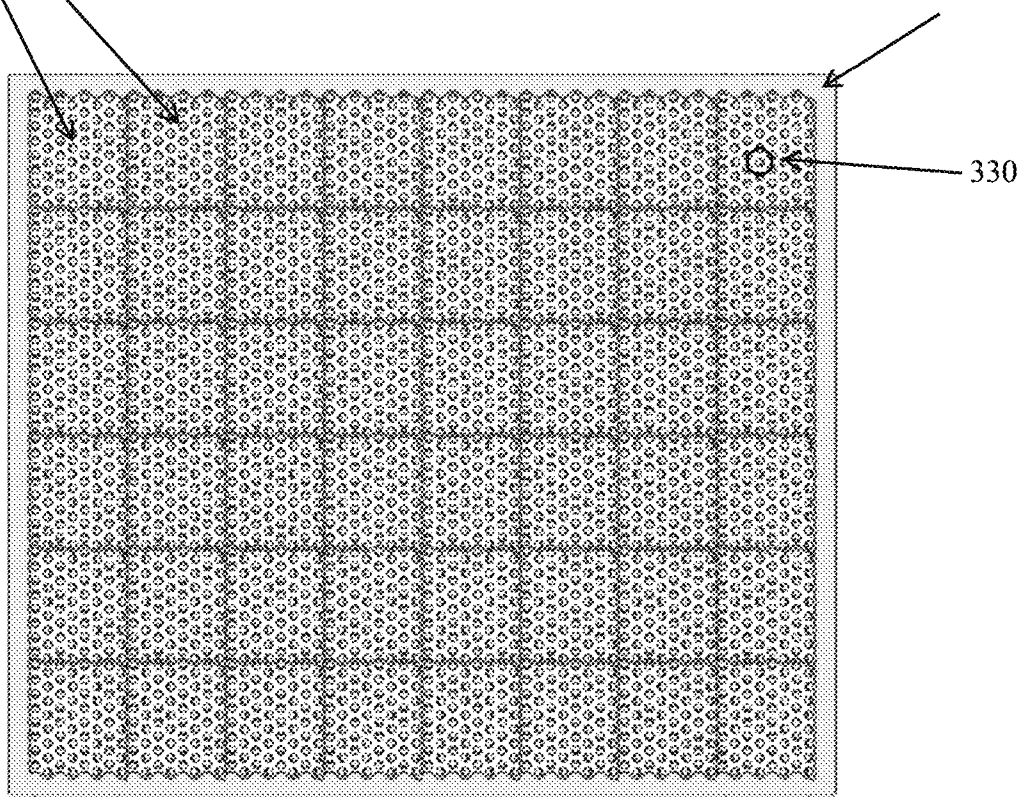
FIG. 3(b)

FIG. 4(a)
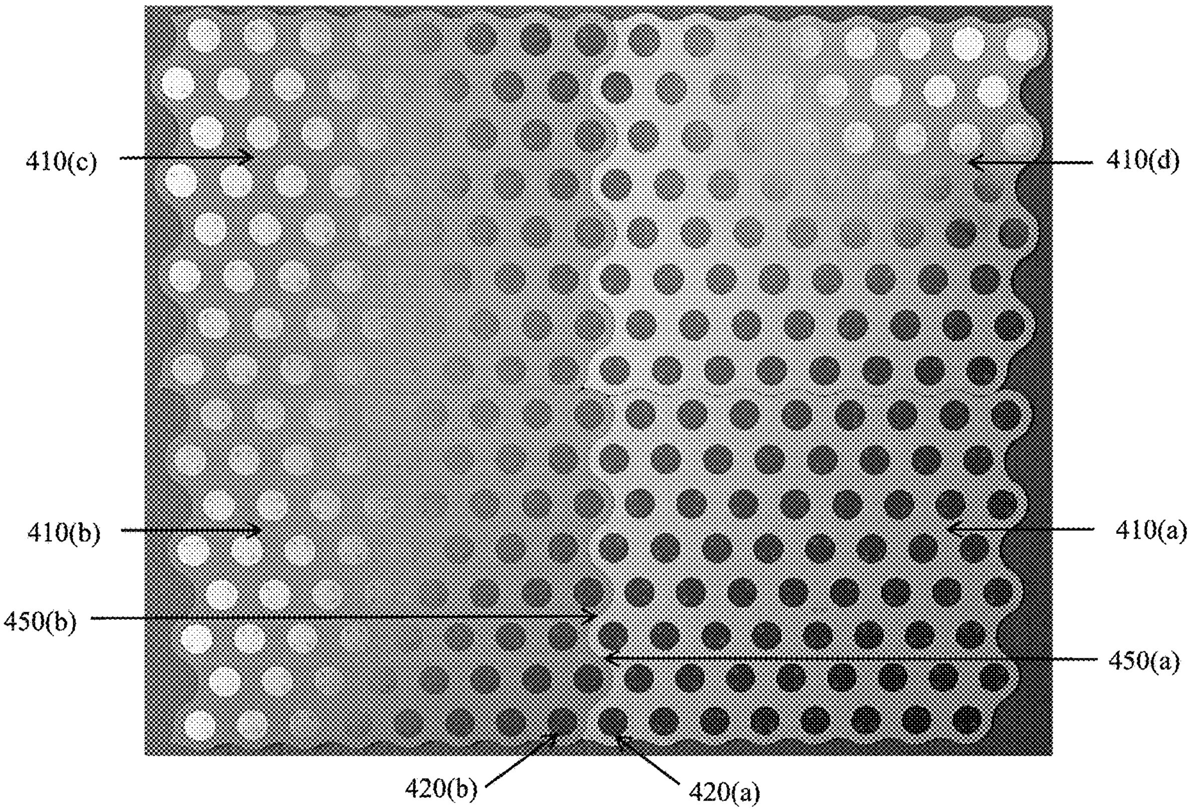
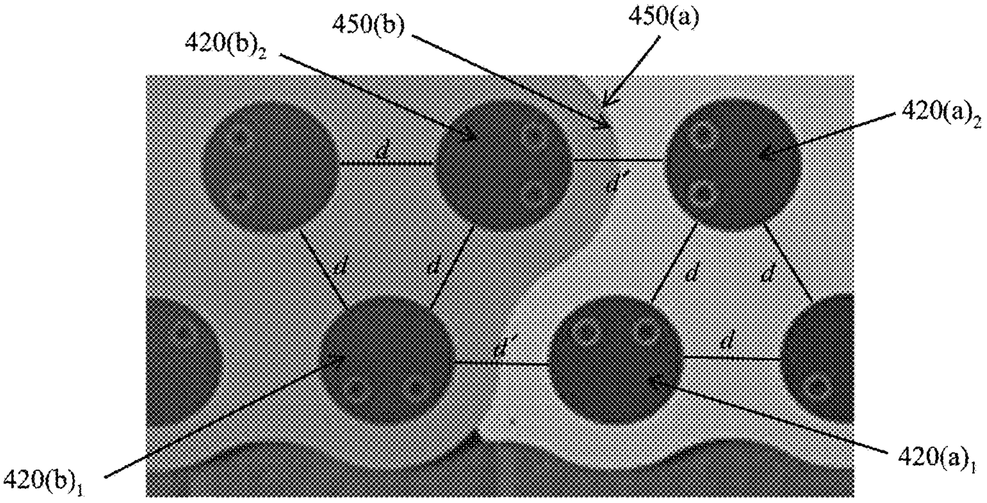
FIG. 4(b)

FIG. 6(a)
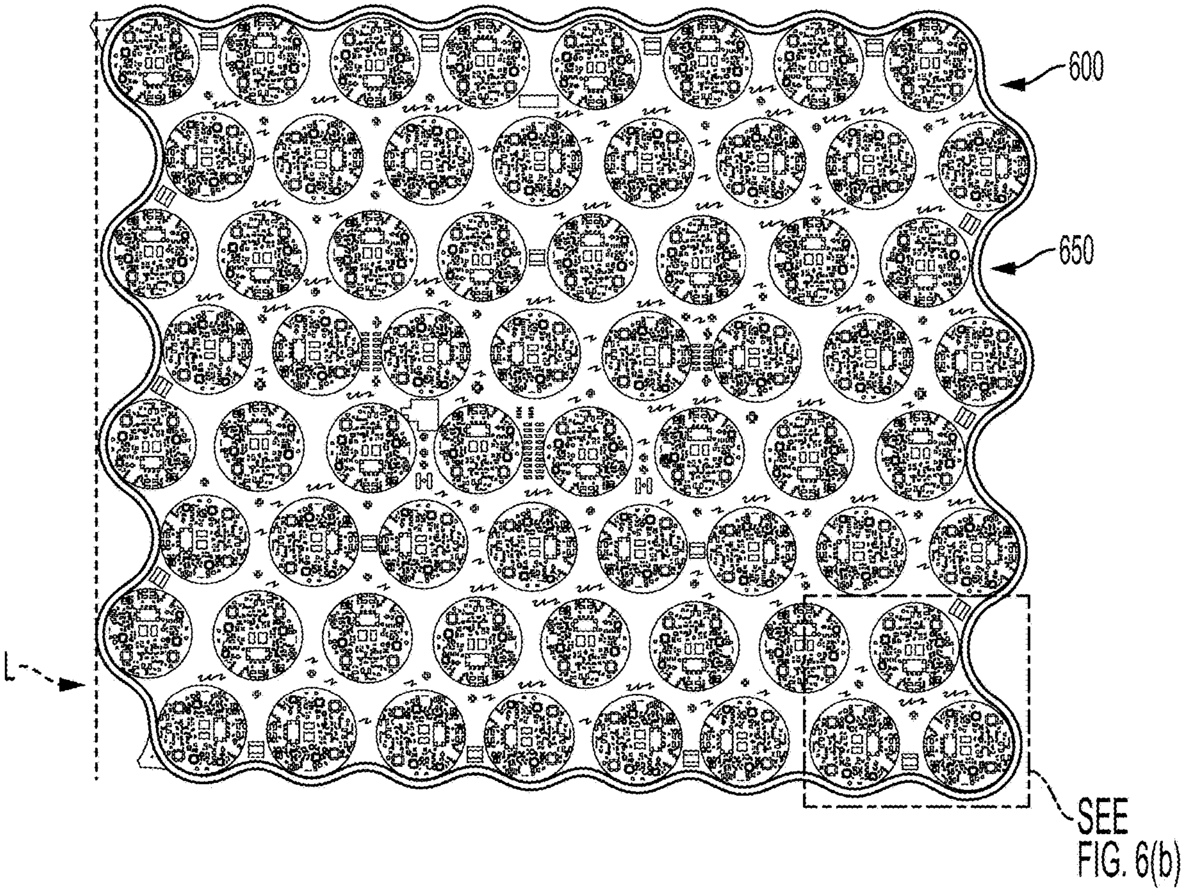
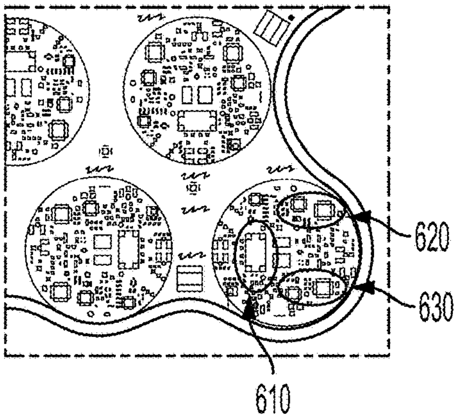
FIG. 6(b)

2D PHASED ARRAY ANTENNA PANEL WITH CONTOURED EDGES

FIELD OF INVENTION

This disclosure relates to two-dimensional (2D) phased-array radar. More specifically, the disclosure relates to, among other things, the shape and configuration of 2D phased-array antenna panels.

BACKGROUND

Unlike mechanically steerable parabolic dish radars, phased-array radars employ an antenna module that remains stationary. The module comprises a grid of fixed antenna elements, each of which are capable of transmitting and receiving a signal. Also, unlike mechanically steerable parabolic dish radar, a phased-array radar can generate multiple beams simultaneously, and steer them electronically much faster than mechanically steerable parabolic dish radar. As such, a phased-array radar can more accurately control how, when and where to direct radar scans and sense multiple objects simultaneously.

Phased-array radars are often used for detecting, identifying, tracking and cataloging objects orbiting the earth. It has been reported that there are over a million objects, some of which are classified as space debris, orbiting the earth. Many, if not most, of these objects have a diameter that is less than 10 cm. In some instances, the objects are as small as 1-2 cm in cross-section. In order to detect, identify, track and catalog orbiting objects that are smaller and smaller in size, the operating frequencies of phased-array radars employed for this purpose can get relatively high, such as frequencies in the S band (2-t14 GHz).

Phased-array radar employed for the aforementioned purpose typically have a large grid of antenna elements spaced apart from each other on a 2D antenna board or panel, where multiple 2D antenna panels are arranged together to form a larger, single 2D antenna module. FIGS. 1(*a*) and 1(*b*) illustrate a three-dimensional and top view, respectively, of a conventional 2D antenna module 100. The antenna module 100 comprises, in this example, 48 2D antenna panels, such as 2D antenna panel 110.

While FIGS. 1(*a*) and 1(*b*) show the plurality of antenna panels 110 that make up the antenna module 100, it does not show the large number of antenna elements on each of the plurality of antenna elements. However, FIG. 2 illustrates a number of conventional, adjacent antenna panels 210 that include an array of antenna elements 220 thereon. Antenna elements can be arranged in a hexagonal configuration or pattern 230, as shown. This is also called a triangular grid, as opposed to a square grid. Of critical importance to the functionality of the phased-array radar is the distance between adjacent antenna elements.

The spacing between antenna elements affects the gain, as a $2^{nd}$ order effect, and natural width of the main beam of the radar away. Within some bounds, decreasing element spacing decreases array gain and increases the grating lobe free field of view. Increasing element spacing increases array gain while decreasing the grating lobe free field of view. Grating lobes appear away (in angle) from the main beam, and they typically do not manifest until a certain look angle is realized. For example, a particular antenna element spacing D might not result in the generation of any grating lobes when the look angle is at boresight (e.g., 0°), but it might result in the generation of grating lobes at useful or important look angles, such as look angles beyond 45° from boresight. Thus, determining antenna element spacing creates somewhat of a tradeoff between gain and field of view.

As a rule of thumb, antenna element spacing of $\lambda/2$ gives a maximum field of view, and is a special case of the equation $D=\lambda/(1+\sin\theta)$, which gives the maximum antenna spacing for avoiding grating lobes for a field of view of $\theta$ degrees. The symbol $\lambda$ represents wavelength, which is inversely proportional to frequency. From the equation, it is clear that D decreases as frequency increases (i.e., as wavelength decreases). In order to capture smaller and smaller objects, frequency can become higher and higher, and thus distance D can become smaller and smaller. For a given wavelength, the smallest resolvable target is roughly $\lambda/5$.

While distances between adjacent antenna elements become smaller and smaller, it is particularly relevant to the present disclosure that this distance be the same for all adjacent antenna elements across the entire 2D antenna module. This is true for adjacent antenna elements located on the same antenna panel as it is for adjacent antenna elements located on different but adjacent antenna panels. However, in conventional phased-array antenna module configurations, such as the phased-array antenna module configuration illustrated in FIGS. 1 and 2, the flat edges of the antenna panels prevent this, particularly when the number of antenna elements is large. More specifically, as illustrated in FIG. 2, the distance d' between the antenna elements located along the edge of one antenna panel and the antenna elements located along the edge of the adjacent antenna panel is typically greater than the distance d between adjacent antenna elements located on the same antenna panel. This is problematic.

When the antenna element spacing d' is greater than the antenna element spacing d, as described above, the power level or gain associated with the main beam is reduced and the gain associated with the side lobes, e.g., grating lobes increases. The disadvantages of this are described above. It is possible to compensate mathematically for sub-optimal side lobe structures using a "pattern synthesis" technique, which involves, among other things, applying a weighting factor to these antenna elements. However, the processing can be complex, time consuming and costly.

BRIEF SUMMARY OF THE INVENTION

In view of the explanation above, a less complex yet effective solution is needed to address the problems associated with the distance d' between the antenna elements located along the edge of one antenna panel and the antenna elements located along the edge of an adjacent antenna panel being different than (e.g., greater than) the distance d between adjacent antenna elements located on the same antenna panel.

The present disclosure addresses the aforementioned problem by providing 2D antenna panels having edges that are contoured, i.e., non-linear, as described in greater detail below. It will be understood that for performance purposes and manufacturing purposes all edges of each antenna panel may be contoured, but particularly those edges that border the edge of an adjacent antenna panel. The contoured edges result in several advantages.

According to the exemplary embodiments described herein below, at least a first advantage associated with the contoured edges is that the antenna elements located along the edge of a given antenna panel are positioned, relative to the antenna elements located along a corresponding edge of an adjacent antenna panel, such that the distance d' between each antenna element along the edge of the given antenna panel and a corresponding antenna element along the corresponding edge of the adjacent antenna panel is equal to the distance d between antenna elements located on the same antenna panel. This, in turn, mitigates the problems described above associated with the distance d' being different a different distance than the distance d.

According to the exemplary embodiments described herein below, a second advantage is that the contoured edges provide sufficient area on the underside of the antenna panel and below each antenna element, particularly those antenna elements located along the antenna panel edges, to accommodate the radio frequency (RF) circuitry associated with each antenna element. In conventional configurations, when the antenna element spacing d' is equal to the antenna element spacing d, the area on the underside of the antenna panel and, more particularly, under the antenna elements located along the edges of the antenna panel, is limited and thus unable to accommodate all of the necessary RF circuitry. Thus, the RF circuitry may need to be located elsewhere and connected to the antenna elements on the antenna panel via cabling which increases manufacturing costs and introduces noise, phase errors and signal losses to the transmit and receive signals that are fed to and received from the antenna elements. In contrast, according to the exemplary embodiments described herein, the RF circuitry associated with each antenna element on a given antenna panel may be located on and integrated into the underside of the antenna panel and connected to the corresponding antenna element through a multilayer board design that requires no cabling. Thus, the exemplary embodiments described herein below also reduce manufacturing costs and achieve higher performance by minimizing the aforementioned noise and signal losses introduced in conventional designs.

A first aspect of the present disclosure, in accordance with exemplary and other embodiments, is directed to a two-dimensional phased-array radar module. The phased-array radar module comprises a plurality of antenna panels. Each of the plurality of antenna panels comprises a plurality of antenna elements, wherein a first distance between each of the plurality of antenna elements, on each of the plurality of antenna panels, and all adjacent antenna elements on the same antenna panel is the same distance. Each of the plurality of antenna panels also comprises a contoured edge that is configured such that the positioning of the contoured edge of a first one of the plurality of antenna panels adjacent to the contoured edge of a second one of the plurality of antenna panels causes each antenna element along the contoured edge of the first one of the plurality of antenna panels to be separated by a second distance from a corresponding antenna element along the adjacent edge of the second one of the plurality of antenna panels, wherein the second distance equals the first distance.

A second aspect of the present disclosure, in accordance with exemplary and other embodiments, is directed to a two-dimensional (2D) antenna panel configured to be combined with a plurality of like 2D antenna panels to form a 2D phased-array antenna module. The 2D antenna panel comprises a plurality of antenna elements, wherein a first distance between each of the plurality of antenna elements and all adjacent antenna elements is the same distance. The 2D antenna panel also comprises a plurality of contoured edges configured such that a positioning of each of the plurality of contoured edges adjacent to a contoured edge of another one of the plurality of like 2D antenna panels causes each antenna element along each of the plurality of contoured edges of the 2D antenna panel to be separated by a second distance from a corresponding antenna element along the adjacent edge of the another one of the plurality of like 2D antenna panels, wherein the second distance equals the first distance.

DESCRIPTION OF THE DRAWINGS

FIGS. 4(*a*) and (*b*) illustrate the positioning of antenna elements on adjacent antenna panels according to exemplary embodiments described herein.

FIGS. 6(*a*) and (*b*) illustrate representative RF circuitry integrated on the underside of an antenna panel according to exemplary embodiments described herein.

DETAILED DESCRIPTION

Figure 1A:
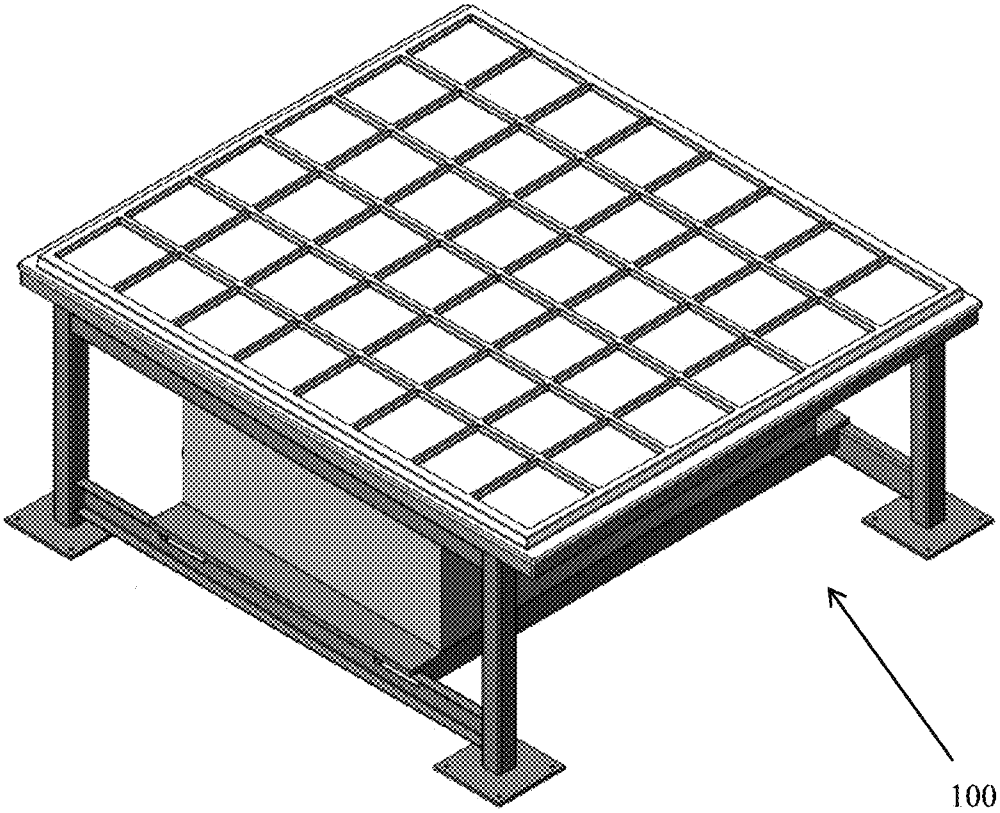
(PRIOR ART) FIG. 1(a)
FIGS. 1(*a*) and 1(*b*) illustrate a 3D view and a top view of an antenna module comprising a plurality of conventional antenna panels.

Generally, this disclosure describes a two-dimensional (2D) phased-array radar module and, more specifically, the 2D antenna panels that make up the radar module. As those skilled in the art of phased-array radar will appreciate, the configurations described herein are exemplary, and that other embodiments are possible and within the intended scope of the disclosure as described herein and claimed. The disclosure is now described in greater detail with references to the figures.

Various terminology as used herein can imply direct or indirect, full or partial, temporary or permanent, action or inaction. For example, when an element or component is referred to as being "on," "connected" or "coupled" to another element or component, the element or component may be directly on, connected or coupled to the other element or component, with or without intervening elements or components, including indirect or direct variants. In contrast, when an element or component is referred to as being "directly connected," "directly coupled," or "directly connected to" another element or component, then there are no intervening elements or components present.

Various terminology as used herein includes various singular forms preceded by "a," "an" and "the," which are intended to include various plural forms as well, unless specific context clearly indicates otherwise. Other terms such as "comprises," "comprising," "includes" and "including," and variations thereof, specify a presence of certain features, elements, components, and the like, but do not preclude the presence or addition of one or more other features, elements, components or the like.

As used herein, the term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Furthermore, relative terms, such as, for example, "below," "lower," "under," "bottom," "above," "upper," and "top" may be used herein to describe one element or component's relationship to another element or component, particularly as presented in the set of accompanying, illustrative drawings. However, such relative terms are intended to encompass different orientations and relative positions in addition to those depicted and described. For example, if a component is described and illustrated as being on an "under" side of something, such as an antenna panel, that component may be described and illustrated as being on an "upper" side when the antenna panel is turned over. Therefore, as stated, various relative terms, such as those mentioned above, as well as others, may encompass different orientations and positions, unless clearly described otherwise.

Terms such as "about" or "substantially" refers to a possible variation from a nominal value/term as those skilled in the art would understand it. Such variation is always included in any given value/term provided herein, whether or not such variation is specifically referred thereto.

Although the terms first, second, etc. can be used herein to describe various elements, components, regions, layers and/or sections, these elements, components, regions, layers and/or sections should not necessarily be limited by such terms, for example, to a specific sequence or order. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain embodiments can be combined and sub-combined in and/or with various other embodiments. Also, different aspects and/or elements of embodiments, as disclosed herein, can be combined and sub-combined in a similar manner as well. Further, some embodiments, whether individually and/or collectively, can be components of a larger system, wherein other procedures can take precedence over and/or otherwise modify their application. Additionally, a number of steps can be required before, after, and/or concurrently with embodiments, as disclosed herein. Note that any and/or all methods and/or processes, at least as disclosed herein, can be at least partially performed via at least one entity in any manner.

Figure 3C:
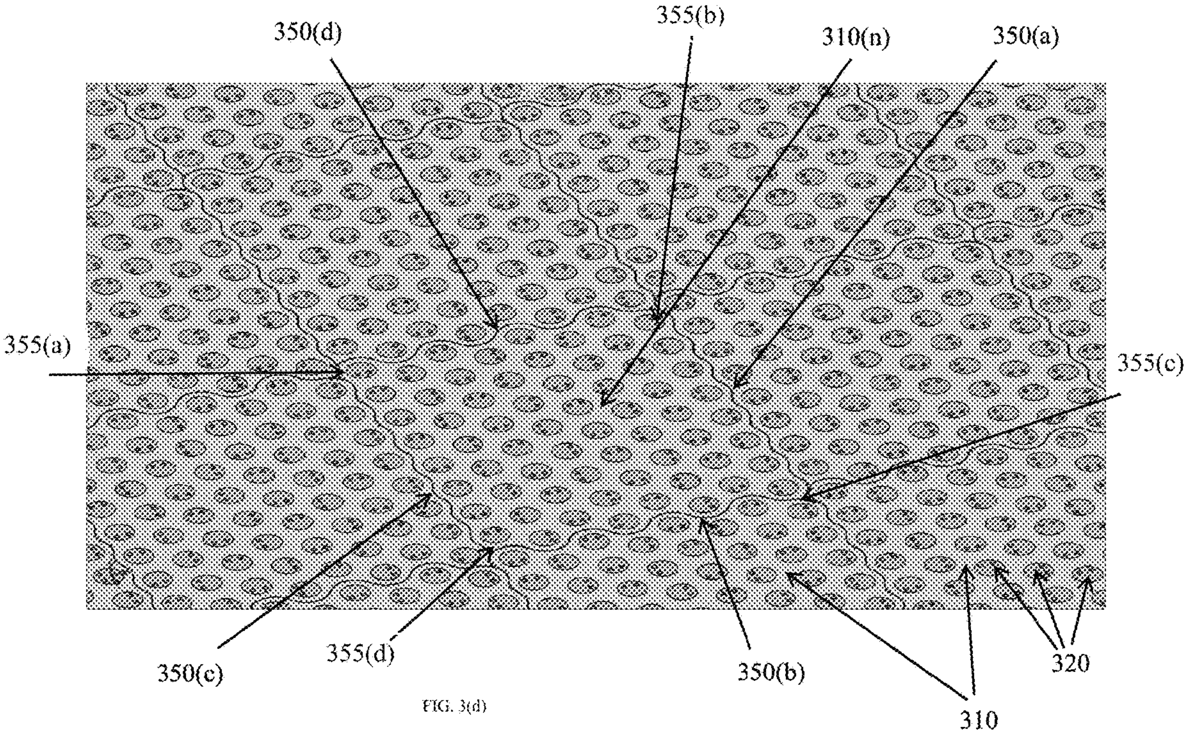
FIGS. 3(*a*), 3(*b*), 3(*c*) and 3(*d*) illustrate a 3D view, a top view and enlarged views of an antenna module comprising a plurality of antenna panels, and a plurality of antenna elements on each of the plurality of antenna panels according to exemplary embodiments described herein.
Figure 3D:
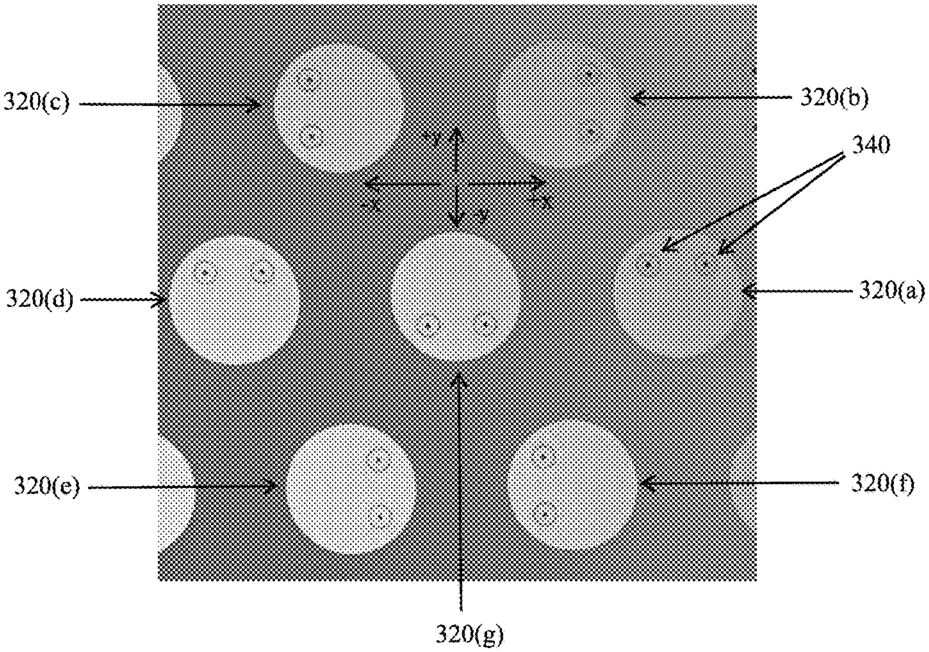

FIGS. 3(*a*) and 3(*b*) illustrate a 3D view and a top view, respectively, of an upper side of an antenna module 300 and an upper side of a plurality of antenna panels 310 that make up antenna module 300, according to the exemplary embodiments described herein. As illustrated in this exemplary embodiment, the plurality of antenna panels 310 that make up antenna module 300 are configured as an 8×6 array of 48 antenna panels 310. However, those having ordinary skill in the art of phased-array radar systems will understand that the inventive subject matter described herein is not limited to an antenna module comprising an array of this size or configuration.

FIG. 3(*c*) is an enlarged illustration of the upper side of a number of the antenna panels 310. As shown, each of the antenna panels 310 comprises a plurality of antenna elements, for example, antenna elements 320. In this exemplary illustration, each antenna panel 310 comprises 64 antenna elements arranged in a hexagonal pattern, as indicated by pattern 330 in FIG. 3(*b*). The specific number of 64 antenna elements is exemplary, as is the hexagonal pattern, and the inventive subject matter described herein is not limited to this specific number of antenna elements on a given antenna panel or this specific antenna element pattern.

As shown in each of FIGS. 3(*a*)-3(*d*), each antenna element comprises a pair of feed points, for example, antenna feeds 340 in FIG. 3(*d*). In the exemplary embodiments described herein, the antenna element is a cross-polarized printed antenna element wherein one feed may be identified as horizontal polarization and the other as vertical polarization. The panels may also transmit in right-hand or left-hand circular polarization. Also, in accordance with the exemplary embodiments described herein, each antenna element is rotated such that the pair of feeds of that antenna element has a different orientation compared to the feeds of each adjacent antenna element. This is best illustrated in FIG. 3(*d*) which shows seven antenna elements 320(*a*)-320(*g*) arranged in the aforementioned hexagonal pattern. Using the x,y coordinate system illustrated in FIG. 3(*d*), it can be seen that the feeds of antenna element 320(*g*), located in the center of the hexagonal pattern, is oriented in a −y direction. However, none of the feeds of the other antenna elements 320(*a*)-320(*h*) are oriented in the −y direction. That is, the feeds of antenna element 320(*a*) are oriented in the +y direction, the feeds of antenna element 320(*b*) are oriented in the +x direction, the feeds of antenna element 320(*c*) are oriented in the −x direction, the feeds of antenna element 320(*d*) are oriented in the +y direction, the feeds of antenna element 320(*c*) are oriented in the +x direction, and the feeds of antenna element 320(*f*) are oriented in the −x direction. However, as stated, none of the feeds associated with antenna elements 320(*a*)-320(*f*) is oriented in the −y direction as is antenna element 320(*g*). The specific orientation of the antenna elements relative to each other is exemplary, as in the above example, and the inventive subject matter described herein is not limited to this specific relative orientation of the antenna elements.

Figure 1B:
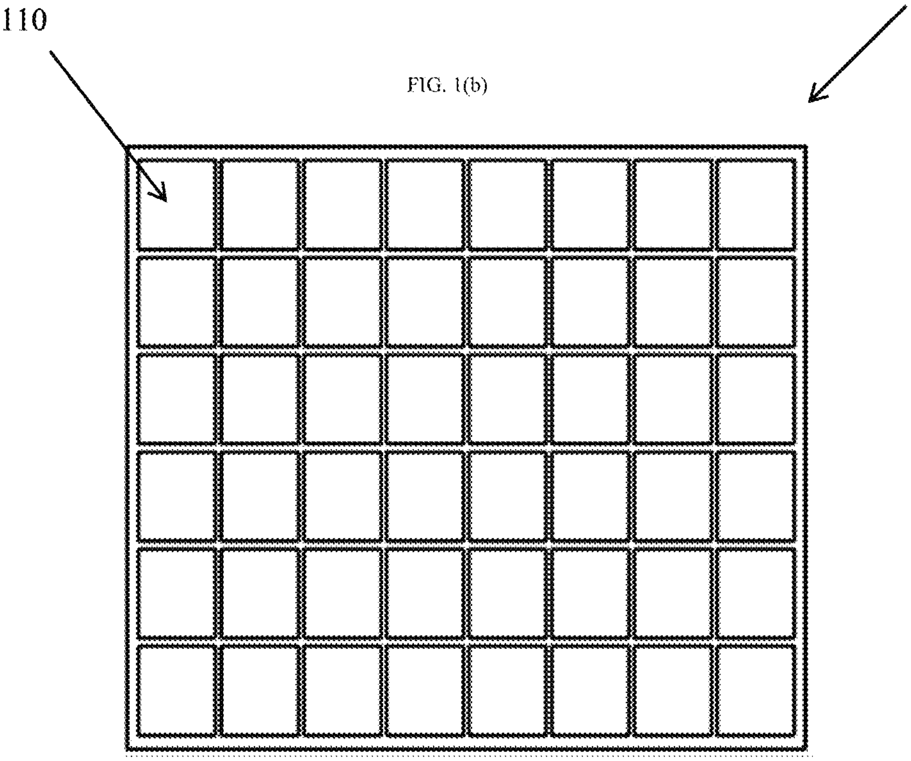
Figure 2:
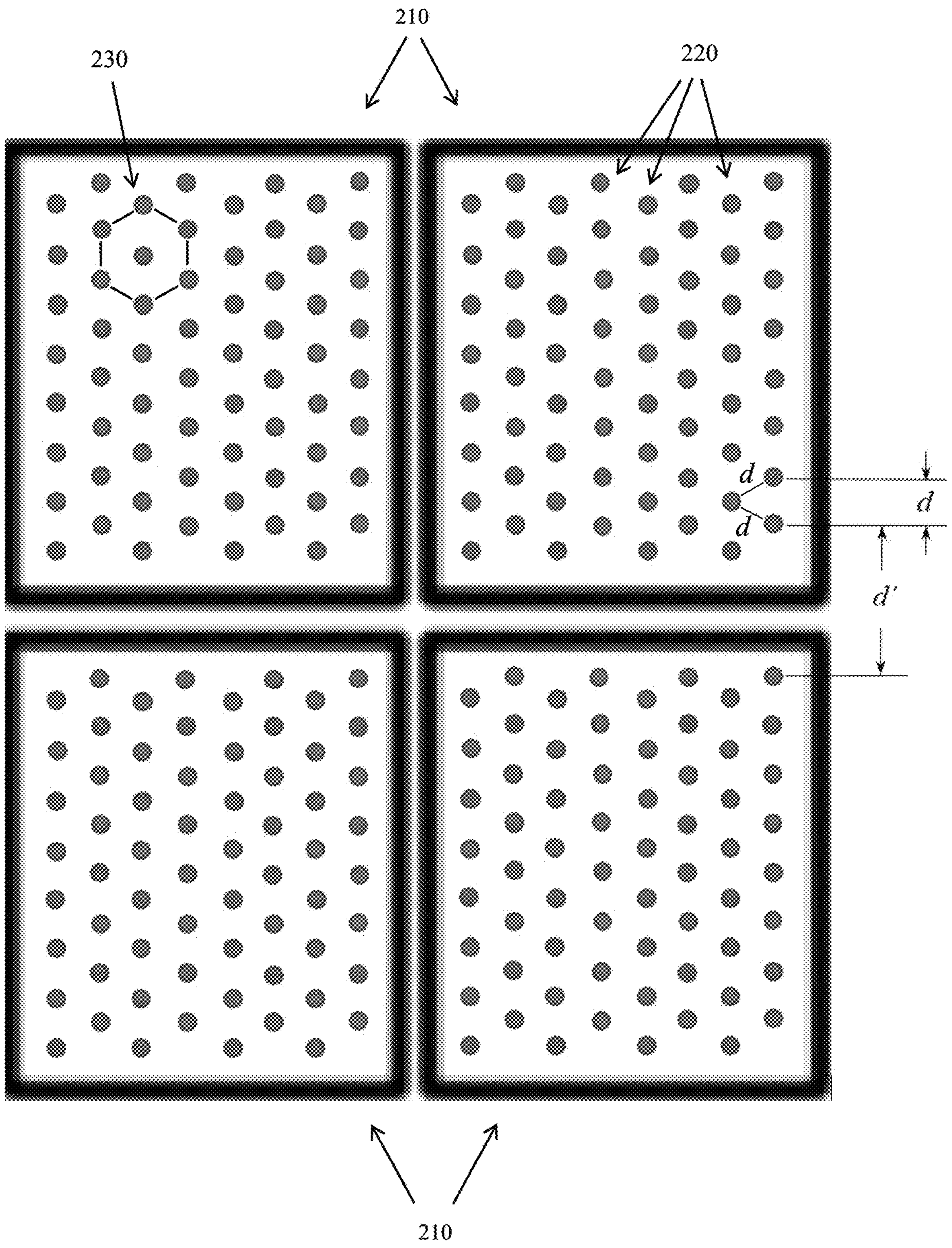
(PRIOR ART) FIG. 2
FIG. 2 illustrates the positioning of antenna elements on adjacent antenna panels according to a conventional configuration.

Of particular importance to the exemplary embodiments described herein is the contoured edges of the plurality of antenna panels 310. The contoured edges are more easily visible in the enlarge illustration of FIG. 3(*c*). For example, in FIG. 3(*c*), antenna panel 310(*n*) has four contoured edges 350(*a*)-350(*d*). That is, the contoured edges 350(*a*)-350(*d*) are not linear, as compared to the edges of the plurality of antenna panels 110 illustrated in FIGS. 1-2. In the exemplary embodiment of FIGS. 3(*a*)-3(*d*), the contoured edges have a "scalloped" appearance somewhat like a sinewave. The nonlinear edges will not meet exactly on the corners, and therefore embodiments can include changes to the contour at the corners to ensure a continuous ground plane. The continuous ground plane can be can be beneficial to the individual antenna pattern and for reflecting RF reducing it strength near sensitive electronics below the antenna array. Holes in the ground plane could create crosstalk or leak between the antennas and the electronics, which would create noise in the signals. Therefore, it can be beneficial to minimize the size of any holes at the corners where panels connect. Patch antennas also perform better when there is a continuous ground sheet below them. Therefore, an additional benefit of some embodiments is ensuring a seamless connection between all panels by adjusting the configuration of the corners to ensure a continuous ground plane.

Other contours are conceivable and within the scope of some embodiments. That is, any contoured antenna panel edging that achieves the intended benefits described in detail herein below would fall within the scope of some embodiments. Thus, a contoured edge with a sawtooth appearance or a contoured edge with a square wave appearance may fall within the scope of some embodiments. However, the sinewave-shaped edge can make it easier to integrate electronics with the panel and combine panels.

The contoured edges allow for an edge around antenna elements arranged in hexagonal or triangular patterns. This pattern allows for more better performing, e.g., more accurate, radar over a square-grid pattern. Having the contoured edges allows for generally rectangular or square panels, but for the edges having a contour. Such an arrangement may case the manufacturing process and allow for larger panels, which improves quality and reduces cost. It is also simpler to manufacture panels in this shape. A straight line bisecting the panel would result in a non-optimal hexagonal- or parallelogram-shaped configuration. A straight line could be drawn through the panel(s), but that would result in a suboptimal diamond shape. Therefore, the contoured edges are important for maintaining a beneficial shape.

As summarized above, by contouring the edges as illustrated, the antenna elements located along the edge of a given antenna panel and the antenna elements located along a corresponding edge of an adjacent antenna panel may be positioned relative to each other, for example, closer to each other, such that the distance d' between the antenna elements of the given antenna panel and the antenna elements of the adjacent antenna panel is equal to the distance d between adjacent antenna elements located on the same antenna panel. FIGS. 4(*a*) and 4(*b*) illustrate how this is achieved.

FIGS. 4(*a*) and (*b*) illustrate the positioning of antenna elements of adjacent antenna panels according to exemplary embodiments described herein. More specifically, FIG. 4(*a*) illustrates four antenna panels 410(*a*), 410(*b*), 410(*c*) and 410(*d*). With regard to antenna panel 410(*a*), it comprises a plurality of antenna elements, e.g., 64 antenna elements, including antenna elements 420(*a*) located along contoured edge 450(*a*) of antenna panel 410(*a*). With regard to antenna panel 410(*b*), it comprises a plurality of antenna elements, e.g., 64, including antenna elements 420(*b*) located along contoured edge 450(*b*) of antenna panel 410(*b*). Referring now to FIG. 4(*b*), it is shown that contoured edge 450(*a*) of antenna panel 410(*a*) and contoured edge 450(*b*) of antenna panel 410(*b*) facilitate the positioning of antenna elements 420(*a*) and 420(*b*) relative to each other, for example, closer to each other, such that the distance d' between the antenna elements located along edge 450(*a*) of antenna panel 410(*a*) and the antenna elements located along edge 450(*b*) of antenna panel 410(*b*) is equal to the distance d between adjacent antenna elements located on the same antenna panel. More specifically, it can be seen that contoured edge 450(*a*) of antenna panel 410(*a*) and contoured edge 450(*b*) of antenna panel 410(*b*) allow antenna element $\mathbf{420}(a)_1$ to be positioned relative to antenna element $\mathbf{420}(b)_1$ such that the distance d' between antenna elements $\mathbf{420}(a)_1$ and $\mathbf{420}(b)_1$ is the same distance as distance d between antenna element $\mathbf{420}(a)_1$ and the antenna elements adjacent to antenna element $\mathbf{420}(a)_1$ on antenna panel 410(*a*), and the same distance as distance d between antenna element $\mathbf{420}(b)_1$ and the antenna elements adjacent to antenna element $\mathbf{420}(b)_1$ on antenna panel 410(*b*). Likewise, it can be seen that contoured edge 450(*a*) of antenna panel 410(*a*) and contoured edge 450(*b*) of antenna panel 410(*b*) also allows antenna element $\mathbf{420}(a)_2$ to be positioned relative to antenna element $\mathbf{420}(b)_2$ such that the distance d' between antenna elements $\mathbf{420}(a)_2$ and $\mathbf{420}(b)_2$ is the same distance as the distance d between antenna element $\mathbf{420}(a)_2$ and the antenna elements adjacent to antenna element $\mathbf{420}(a)_2$ on antenna panel 410 (*a*), and the same distance d between antenna element $\mathbf{420}(b)_2$ and the antenna elements adjacent to antenna element $\mathbf{420}(b)_2$ on antenna panel 410(*b*). The same is true with regard to the distance d' between each of the antenna elements 420(*a*) and the corresponding one of the antenna elements 420(*b*) being the same distance as the distance d between each of the antenna elements 420(*a*) and the adjacent antenna elements on antenna panel 410(*a*), and the same distance as the distance d between each of the antenna elements 420(*b*) and the adjacent antenna elements on antenna panel 410(*b*).

The contoured edges described above provide a number of significant advantages over conventional configurations. The first advantage is directly related to the relative positioning of the antenna elements such that the distance d' between each of the antenna elements along the edge of a given antenna panel and the corresponding antenna elements along the edge of an adjacent antenna panel is the same distance as the distance d between adjacent antenna elements on the same antenna panel. When the distances d' and d, as defined above, are the same distance, the received radar signals can be processed more quickly, more efficiently and more accurately. In contrast, when the distance d' does not equal the distance d, the power level or gain associated with the main beam and any side lobes will vary. When, more specifically, the distance d' is greater than the distance d, the power level or gain associated with the main beam is reduced and the gain associated with any side lobes is increased. As those skilled in the art will appreciate, reducing the power level or gain of the main beam can reduce the level of the received radar signals, making it more difficult to detect, identify and track an intended object. On the other hand, increasing the power level of any side lobes that are generated could result in unwanted radar signals at certain desirable look angles. To correct the undesirable effects associated with d' and d not being the same distance, it may be possible to compensate by employing mathematically complex processing techniques, as mentioned above, which increase processing time, increase processing complexity and offer less accurate results. In short, a consistent array shape results in better beamforming and therefore stronger received signals/higher SNR. The contoured edges as describe herein eliminate or at least minimize the need to employ such complex techniques.

A second advantage of the contoured edges described above relates to the ability to integrate the RF circuitry associated with each antenna element into the underside of a multilayer antenna panel. As explained above, the need to detect, identify and track smaller and smaller objects has resulted in the utilization of radar signals having smaller wavelengths, which translates into a decrease in distance D between antenna elements on each of the antenna panels, according to the general equation $D=\lambda/(1+\sin\theta)$. As D decreases, that is, as the distance between antenna elements decreases, and more antenna elements are placed on a given antenna panel, there is less room available on the antenna panel for the RF circuitry needed to condition the transmit and receive signals. Of course, one alternative is to move some or all of the RF circuitry off the antenna panel; however, this is not an ideal solution. Doing so may drive up manufacturing costs and it would most result in signal strength losses and phase errors due to the fact that the transmit and receive signals would have to be routed via cabling to and from the antenna elements. Thus, being able to accommodate the RF circuitry for all of the antenna elements into the antenna panel is a significant advantage.

Figure 5:
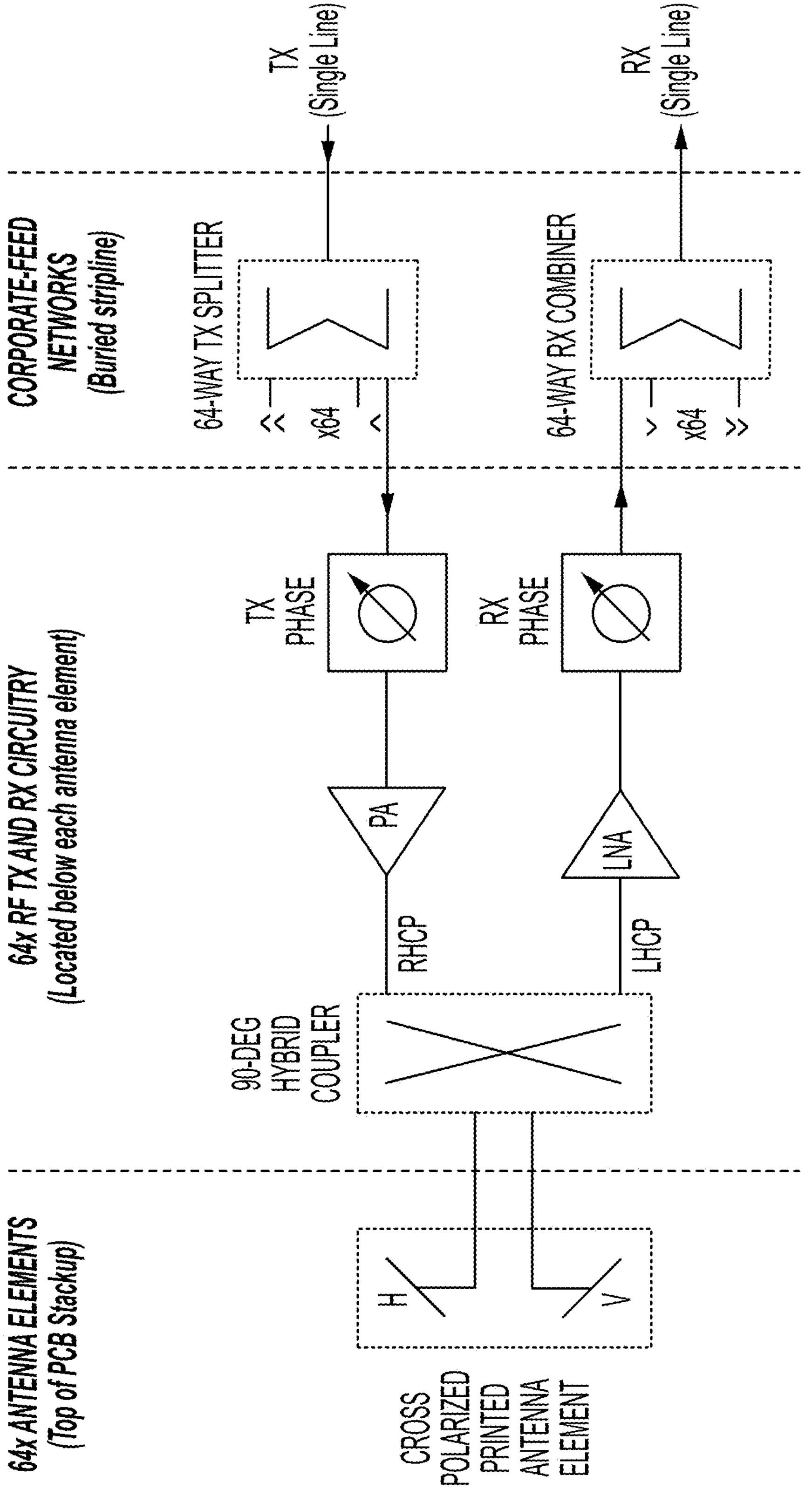
FIG. 5 graphically illustrates certain RF components located on the top side and underside of an antenna panel according to exemplary embodiments described herein.

FIG. 5 illustrates one representative antenna element of a plurality of antenna elements on a given antenna panel, the RF circuitry associated with this antenna element, and the corporate feed networks that distribute the transmit signal and combine the receive signals to and from each of the plurality of antenna elements, e.g., 64 antenna elements, according to the exemplary embodiments described herein. More specifically, FIG. 5 shows the representative antenna element as being a cross polarized printed antenna element comprising an H (horizontal) and V (vertical) feeds. The representative antenna element along with the other plurality of antenna elements are located on the top or upper side of the antenna panel, with the understanding that the antenna panel is facing in an upward orientation. Further, as shown in FIG. 5, and in accordance with the exemplary embodiments disclosed herein, the RF circuitry associated with each antenna element includes, but is not limited to, RF transmit (TX) and receive (RX) circuitry. The RF TX and RX circuitry is located below the antenna element, to which it corresponds, and is integrated into the antenna panel, for example, on the layer of the antenna panel that forms the underside or lower most layer of the antenna panel. The RF circuitry also includes a 90-degree hybrid coupler, a power amplifier (PA) associated with the transmit signal phase shifter (TX phase rotation), and a low-noise amplifier (LNA) associated with the receive signal phase shifter (RX phase rotation).

In the example of FIG. 5, the transmit signal input is represented as a single line from the Software Defined Radio (SDR). The SDR is a radio transceiver capable of full duplex operation. It utilizes sampling techniques and Analog to Digital/Digital to Analog convertors to digitize the analog RF signal and process accordingly in the digital domain. As there are 64 antenna elements on the antenna panel in the exemplary embodiments, the transmit input is fed to a 64-way transmit (TX) splitter in order to distribute the transmit signal to each of the 64 antenna elements. Similarly, the radar signal received from each of the 64 antenna elements is fed through a 64-way receive (RX) combiner, and then the single combined output signal is fed back to the SDR on a single line. The 64-way TX splitter and the 64-way RX combiner are, according to the exemplary embodiments described herein, also integrated into the antenna panel.

FIG. 6(*a*) illustrates the underside of a given antenna panel 600 with the RF circuitry integrated therein for each of 64 exemplary, corresponding antenna elements (not shown). As explained above, and as illustrated in FIG. 6(*b*), the RF circuitry includes a 90-degree hybrid coupler, for example, 90-degree hybrid coupler 610; RF TX circuitry, for example RF TX circuitry 620; and RF RX circuitry, for example, RF RX circuitry 630. Each antenna element may optionally include a large ground coupler (not shown), such as a ring around the entire antenna element and RF circuitry to create a substantial ground connection to improve signal quality. The ring around the element may include fencing vias that run through the board for shielding from one cell to the next or one cell to the corporate feed network.

It should be noted that the antenna panel 600 has a border 650. The purpose of the border is to create a continuous ground plane to shield the RF circuitry on the underside of the antenna panel from the RF emissions being transmitted and received by the antenna elements on the top or upper side of the antenna panel. The border can comprise any material suitable to serve this purpose. I can also be important for the operation of the antenna array for all ground planes to have the same potential panel-to-panel.

A subframe can be included to connect the various panels, and having a generally square or rectangularly shaped panel can simplify the subframe design, and improves the ability to maintain a continuous ground plane. The subframe can allow borders 650 to electrically couple, thereby forming a continuous ground plane to shield the sensitive circuitry.

It is important to reiterate that the contoured edges of the antenna panels make it possible to integrate the RF circuitry for each antenna element, and the corporate-feed networks into the antenna panel. This is particularly the case for the RF circuitry associated with the antenna elements located along the edges of each antenna panel. As can be seen in FIGS. 6(*a*) and (*b*), the contoured edges accommodate the space needed for the RF circuitry, such that the RF circuitry, according to preferred embodiments, is integrated in such a way that is aligned with the corresponding antenna element on the antenna panel. If, on the other hand, the edges of antenna panel 600 were non-contoured, i.e., flat, as illustrated by Line L in FIG. 6(*a*), and the edges of the antenna panel adjacent to antenna panel 600 were non-contoured, it will be apparent that the distance between each of the antenna elements along the edge of one antenna panel and a corresponding one of the antenna elements along the edge of the adjacent antenna panel at Line L would not be equal to the distance between adjacent antenna elements on the same antenna panel. As explained above, it is undesirable for these distances not to be equal.

Figure 7:
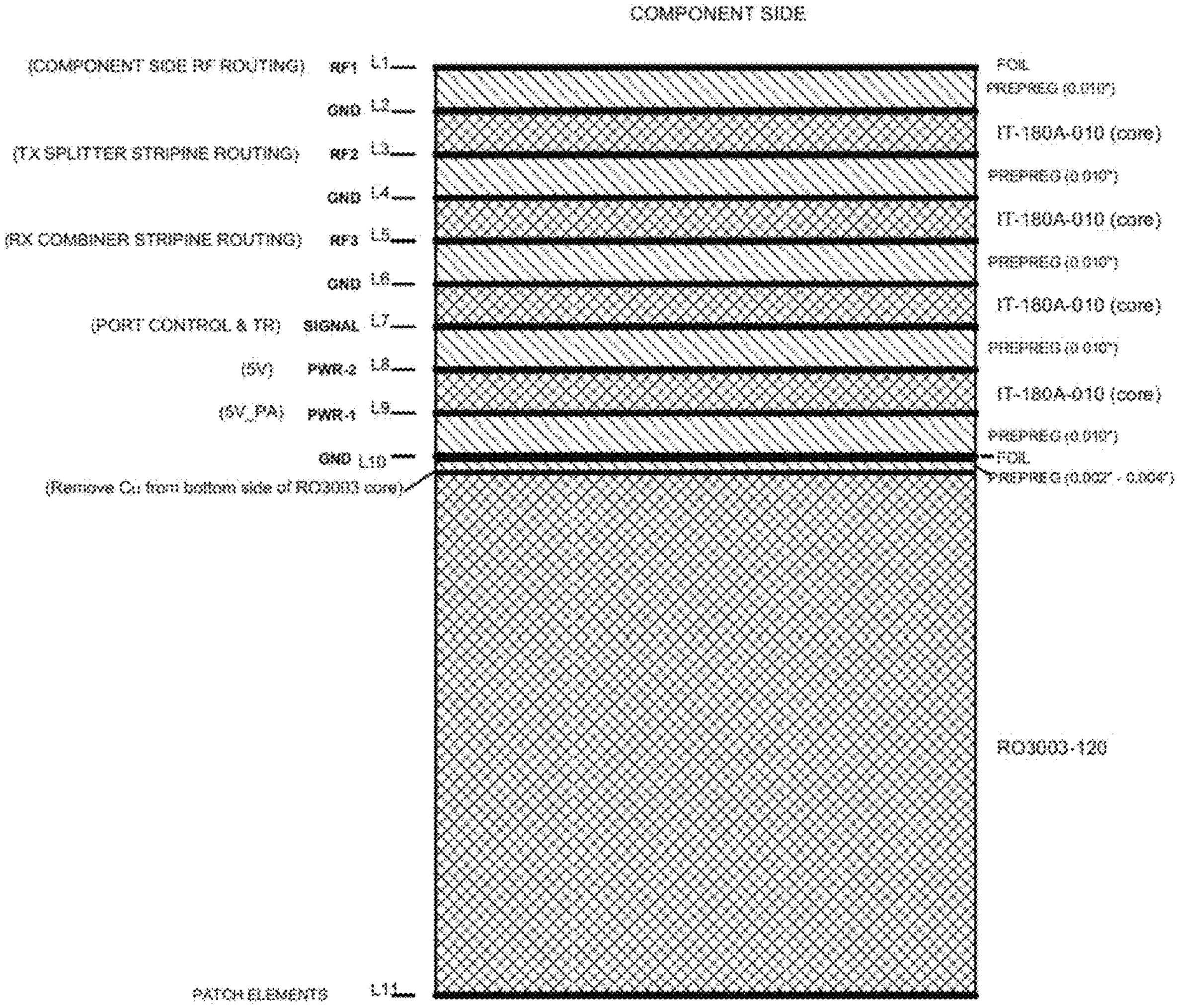
FIG. 7 illustrates a representative multilayer board configuration for the antenna panels according to exemplary embodiments described herein.

FIG. 7 illustrates, according to exemplary embodiments described herein, a multilayer board configuration that instantiates the plurality of antenna elements, the RF circuitry in communication with each of the plurality of antenna elements and the corporate-feed networks into a single corresponding antenna panel. More specifically, FIG. 7 shows a multilayer printed circuit board assembly for incorporating the antenna elements, associated RF circuitry and the corporate-feed networks onto a single integrated antenna panel. To the right of each layer in FIG. 7 is an example of the material used to create the stackup. These include core material and thickness as well as the bonding or prepreg layers. It can be useful to combine electronics onto a single multilayer board to reduce cost and complexity of installation and repair. Other prior art methods include separating antennas from electronic components, which can increase complexity and cost. Therefore, combining the electronics, as illustrated in FIG. 7, can reduce cost and complexity, which is an additional benefit over the prior art.

In the exemplary embodiment illustrated in FIG. 7, there is a total of eleven laminated layers. The first layer L11 in FIG. 7 is an outer layer and incorporates the antenna elements, which are identified in FIG. 7 as patch antennas. In accordance with this exemplary embodiment, the first layer L11 is a planar design using a low-loss and stable core material. The element pattern may be realized by etching copper. The remaining ten layers are bonded to the antenna element layer L11. Connections between the layers are achieved using plated via connections as needed. As explained above, no cabling is needed between any antenna elements and the corresponding RF circuitry, in accordance with the exemplary embodiments described herein. Again, as stated above, this reduces costs while lowering the losses associated with the antenna-feed connections.

As is clear from FIG. 7, the ten layers bonded to the first or antenna element layer include the related RF circuitry and corporate-feed networks. Thus, as shown in this exemplary embodiment, layer L5 comprises the buried stripline for the RX combiner. Layer L3 comprises the buried stripline for the TX splitter. And, Layer L1 comprises the RF circuitry, such as the 90-degree hybrid coupler, the transmit and receive amplifiers and phase rotation components, which were illustrated and described above with reference to FIGS. 5, 6(*a*) and 6(*b*). There are a number of ground (GND) layers between the aforementioned functional layers, L2, L4, L6 and L10. Also, there are two layers L8 and L9 over which power is supplied to the components on the board, i.e., the antenna panel.

Layers L3 and L5 instantiate the corporate-feed networks. As explained, these layers distribute the transmit signal and combine the receive signals to and from the plurality of antenna elements, e.g., all 64 antenna elements. This is accomplished using impedance-matched stripline connections buried between the aforementioned alternating ground plane layers. Incorporating the corporate-feed networks into the antenna panel, in and of itself, provides substantial cost savings from a manufacturing perspective. It also reduces design complexity compared to a design that externally combines the antenna elements using, e.g., a separate 64-way combiner/divider module and associated coaxial cabling. Using external cabling to combine antenna elements could also compromise the phase stability of the system over temperature variations, and thus result in phase errors affecting beam formation and pointing accuracy. External cabling could have other problems, including substantially increased cost, PCB material may suffer phase issues over temperature. It is also common to get phase-matched cables, whereas PCB traces can be length-matched.

As stated, the multilayer board design for the antenna panels is important for several reasons. It keeps the per-element costs low enough to make the design realizable and still achieve the highest performance by eliminating cabling running from the antenna panel to functionally similar elements located off the antenna panel. Furthermore, the design is more compact and allows the configuration to the λ/2, requirement described above, as wavelengths get smaller (i.e., frequencies get higher), and the distance between antenna elements get smaller.

Various corresponding structures, materials, acts, and equivalents of any means or step plus function elements in various claims below are intended to include any such structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

This detailed description above has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

We claim:

1. A two-dimensional (2D) phased-array radar module having a plurality of antenna panels, wherein each of the plurality of antenna panels comprises:

a plurality of antenna elements, wherein a first distance between each of the plurality of antenna elements, on each of the plurality of antenna panels, and all adjacent antenna elements on the same antenna panel is the same distance; and a contoured edge that is configured such that the contoured edge of a first one of the plurality of antenna panels adjacent to the contoured edge of a second one of the plurality of antenna panels causes each antenna element along the contoured edge of the first one of the plurality of antenna panels to be separated by a second distance from a corresponding antenna element along the adjacent edge of the second one of the plurality of antenna panels, wherein the second distance equals the first distance.

2. The 2D module of claim 1, wherein each of the plurality of antenna panels further comprises:

a plurality of contoured edges, wherein each of the plurality of contoured edges of each of the plurality of antenna panels is configured such that each of the plurality of contoured edges of each of the plurality of antenna panels adjacent to the contoured edge of another one of the plurality of antenna panels causes each antenna element along each of the plurality of contoured edges to be separated by a third distance from a corresponding antenna element along the adjacent contoured edge of the another one of the plurality of antenna panels, wherein the third distance equals the first distance and the second distance.

3. The 2D module of claim 1, wherein the contoured edge of each of the plurality of antenna panels is configured in a form of a sinewave.

4. The 2D module of claim 1, wherein each of the plurality of antenna panels is configured as a multilayer printed circuit board, and wherein a first, outer layer of each of the plurality of antenna panels has incorporated therein the plurality of antenna elements associated with that antenna panel.

5. The 2D module of claim 4, wherein radio frequency (RF) circuitry associated with each of the plurality of antenna elements, on each of the plurality of antenna panels, is integrated into the multilayer board configuration of each antenna panel and aligned with and in communication with the corresponding one of the plurality of antenna elements without any cabling therebetween.

6. The 2D module of claim 5, wherein the RF circuitry includes transmit RF circuitry, wherein a second layer of the multilayer board configuration of each of the plurality of antenna panels comprises the transmit RF circuitry.

7. The 2D module of claim 6, wherein the RF circuitry includes receive RF circuitry, wherein a third layer of the multilayer board configuration of each of the plurality of antenna panels comprises the receive RF circuitry.

8. The 2D module of claim 7, wherein a fourth layer of the multilayer board configuration of each of the plurality of antenna panels comprises a corporate-feed network, the corporate-feed network of each of the plurality of antenna panels is configured to distribute an input signal to each of the plurality of antenna elements on the corresponding antenna panel via the transmit RF circuitry, and receive a combined output signal from the plurality of antenna elements on the corresponding antenna panel via the receive RF circuitry, and wherein the corporate-feed network receives the input signal from and transmits the output signal to a Software Defined Radio (SDR).

9. The 2D module of claim 1, wherein the plurality of antenna elements on each of the plurality of antenna panels are configured in a hexagonal pattern.

10. A two-dimensional (2D) antenna panel configured to be combined with a plurality of like 2D antenna panels to form a 2D phased-array antenna module, the 2D antenna panel comprising:

a plurality of antenna elements, wherein a first distance between each of the plurality of antenna elements and all adjacent antenna elements is the same distance; and a plurality of contoured edges configured such that a positioning of each of the plurality of contoured edges adjacent to a contoured edge of another one of the plurality of like 2D antenna panels causes each antenna element along each of the plurality of contoured edges of the 2D antenna panel to be separated by a second distance from a corresponding antenna element along the adjacent edge of the another one of the plurality of like 2D antenna panels, wherein the second distance equals the first distance.

11. The 2D antenna panel of claim 10, wherein the plurality of contoured edges of the 2D antenna panel are configured in the form of a sinewave.

12. The 2D antenna panel of claim 10, wherein the 2D antenna panel is configured as a multilayer printed circuit board, and wherein a first, outer layer of the 2D antenna panel has incorporated therein the plurality of antenna elements.

13. The 2D antenna panel of claim 12, wherein radio frequency (RF) circuitry associated with each of the plurality of antenna elements is integrated into the multilayer board configuration, and aligned with and in communication with a corresponding one of the plurality of antenna elements without any cabling therebetween.

14. The 2D module of claim 13, wherein the RF circuitry for each of the plurality of antenna elements includes transmit circuitry, and wherein a second layer of the multilayer board configuration comprises the transmit RF circuitry.

15. The 2D module of claim 14, wherein the RF circuitry for each of the plurality of antenna elements includes receive RF circuitry, and wherein a third layer of the multilayer board configuration of each of the plurality of antenna panels comprises the receive RF circuitry.

16. The 2D module of claim 15, wherein a fourth layer of the multilayer board configuration comprises a corporate-feed network, the corporate-feed network configured to distribute an input signal to each of the plurality of antenna elements via the transmit RF circuitry, and receive a combined output signal from the plurality of antenna elements via the receive RF circuitry, and wherein the corporate-feed network receives the input signal from and transmits the output signal to a Software Defined Radio (SDR).

17. The 2D antenna panel of claim 10, wherein the plurality of antenna elements are configured in a hexagonal pattern.

18. A two-dimensional (2D) phased-array antenna panel comprising:

a plurality of antenna elements, wherein the plurality of antenna elements are arranged in a grid that cannot be bisected by a straight line without passing through one or more of the plurality of antenna elements; and one or more contoured edges, wherein the one or more contoured edges are formed around antenna elements on the edge of the antennal panel, and are further configured to mate with one or more additional phased-array antennal panels.

19. The antenna panel of claim 18, wherein the one or more contoured edges comprises a border configured to be connected to ground and to a border of an adjacent panel.

20. The antenna panel of claim 18, wherein the one or more contoured edges comprises one or more corners configured to minimize a hole and form a continuous ground plane.

21. The antenna panel of claim 18 further comprising: a multilayer printed circuit board.

22. The antenna panel of claim 21, wherein the multilayer printed circuit board comprises:

a 90° hybrid coupler, phase rotation components, an RX combiner, and a TX splitter.

* * * * *